US010353225B2

(12) United States Patent
Yashiki et al.

(10) Patent No.: US 10,353,225 B2
(45) Date of Patent: Jul. 16, 2019

(54) ELECTRODE STRUCTURE FOR SILICON PHOTONICS MODULATOR

(71) Applicant: PHOTONICS ELECTRONICS TECHNOLOGY RESEARCH ASSOCIATION, Tokyo (JP)

(72) Inventors: Kenichiro Yashiki, Tokyo (JP); Yasuyuki Suzuki, Tokyo (JP)

(73) Assignee: PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/751,714

(22) PCT Filed: Aug. 11, 2015

(86) PCT No.: PCT/JP2015/072747
§ 371 (c)(1),
(2) Date: Feb. 9, 2018

(87) PCT Pub. No.: WO2017/026049
PCT Pub. Date: Feb. 16, 2017

(65) Prior Publication Data
US 2018/0231809 A1  Aug. 16, 2018

(51) Int. Cl.
*G02F 1/01* (2006.01)
*G02F 1/03* (2006.01)
(Continued)

(52) U.S. Cl.
CPC ............ *G02F 1/0356* (2013.01); *G02F 1/011* (2013.01); *G02F 1/0121* (2013.01); *G02F 1/025* (2013.01);
(Continued)

(58) Field of Classification Search
CPC ........ G02F 1/0356; G02F 1/011; G02F 1/025; G02F 1/0121; G02F 1/0327; G02F 2201/07; G02F 2201/12; H04B 10/516
(Continued)

(56) References Cited

U.S. PATENT DOCUMENTS

2007/0031080 A1* 2/2007 Liu .......................... G02F 1/025
385/3
2012/0087614 A1 4/2012 Ishimura et al.
(Continued)

FOREIGN PATENT DOCUMENTS

| JP | 2003-322831 A | 11/2003 |
| JP | 2012-078759 A | 4/2012 |
| WO | WO-2013/042753 A1 | 3/2013 |

OTHER PUBLICATIONS

Ran Ding et al., "High-Speed Silicon Modulator With Slow-Wave Electrodes and Fully Independent Differential Drive," Journal of Lightwave Technology, Jun. 15, 2014, pp. 2240-2247 (8 pages), vol. 32, Issue 12, IEEE, USA.
(Continued)

*Primary Examiner* — Michael P Mooney
(74) *Attorney, Agent, or Firm* — Michael Best & Friedrich LLP

(57) ABSTRACT

The purpose of the present invention is to allow a silicon photonics modulator to be operated at high speed with high frequency by providing an electrode structure for the small multichannel high-density silicon photonics modulator. This electrode structure for a silicon photonics modulator includes, on the planar surface of a silicon substrate, a first layer for forming a plurality of bias electrical wirings, and a second layer formed by aligning each of a plurality of ground electrode portions and each electrical wiring in the first layer.

3 Claims, 15 Drawing Sheets

(51) Int. Cl.
*G02F 1/025* (2006.01)
*G02F 1/035* (2006.01)
*H04B 10/516* (2013.01)

(52) U.S. Cl.
CPC ........ *G02F 1/0327* (2013.01); *G02F 2201/12* (2013.01); *H04B 10/516* (2013.01)

(58) Field of Classification Search
USPC ........................................................ 385/1–3
See application file for complete search history.

(56) References Cited

U.S. PATENT DOCUMENTS

2014/0233962 A1   8/2014   Kato
2014/0369637 A1   12/2014  Hoffmann

OTHER PUBLICATIONS

"10Gb/s Compact InP MZ Modulator with DWDM Laser", Thinking Optical Solutions, (12 pages), Dec. 2004, Issue C, Bookham, Inc., USA.
International Search Report issued in Application No. PCT/JP2015/072747, dated Oct. 20, 2015.
Office Action issued in Japanese Patent Application No. 2014-156246, dated May 30, 2018.

\* cited by examiner

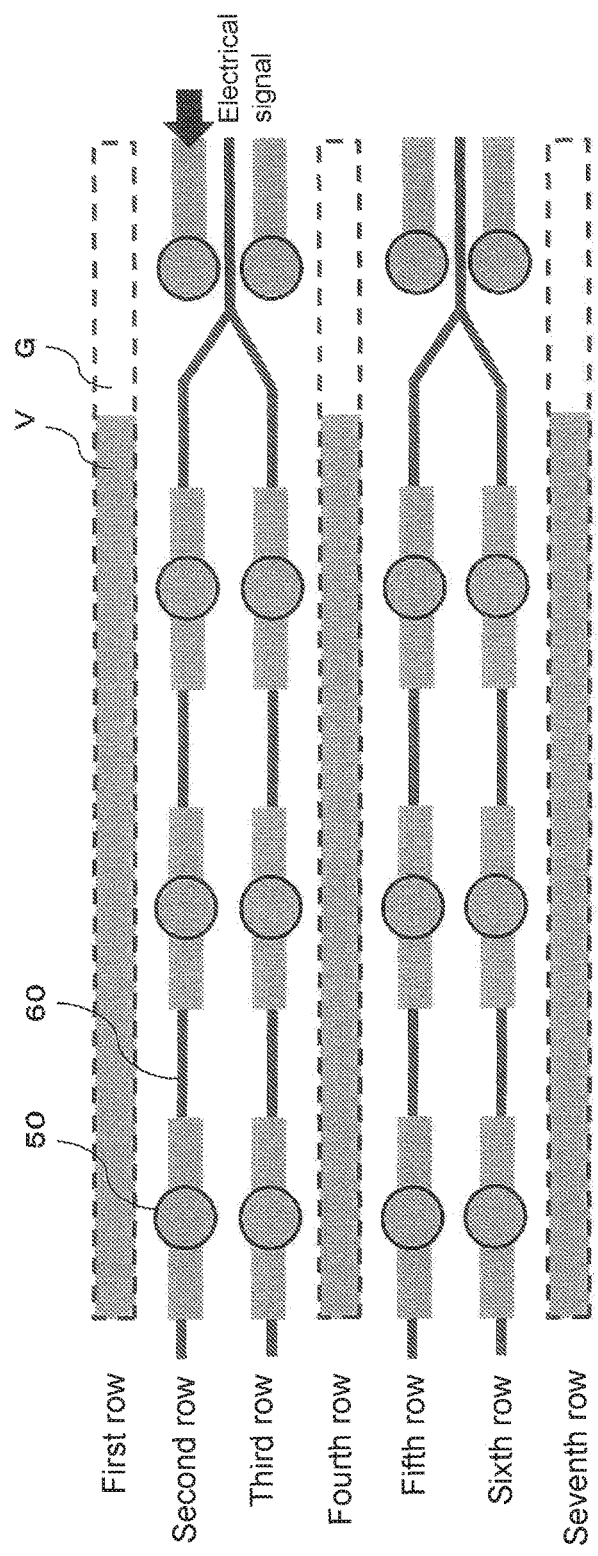

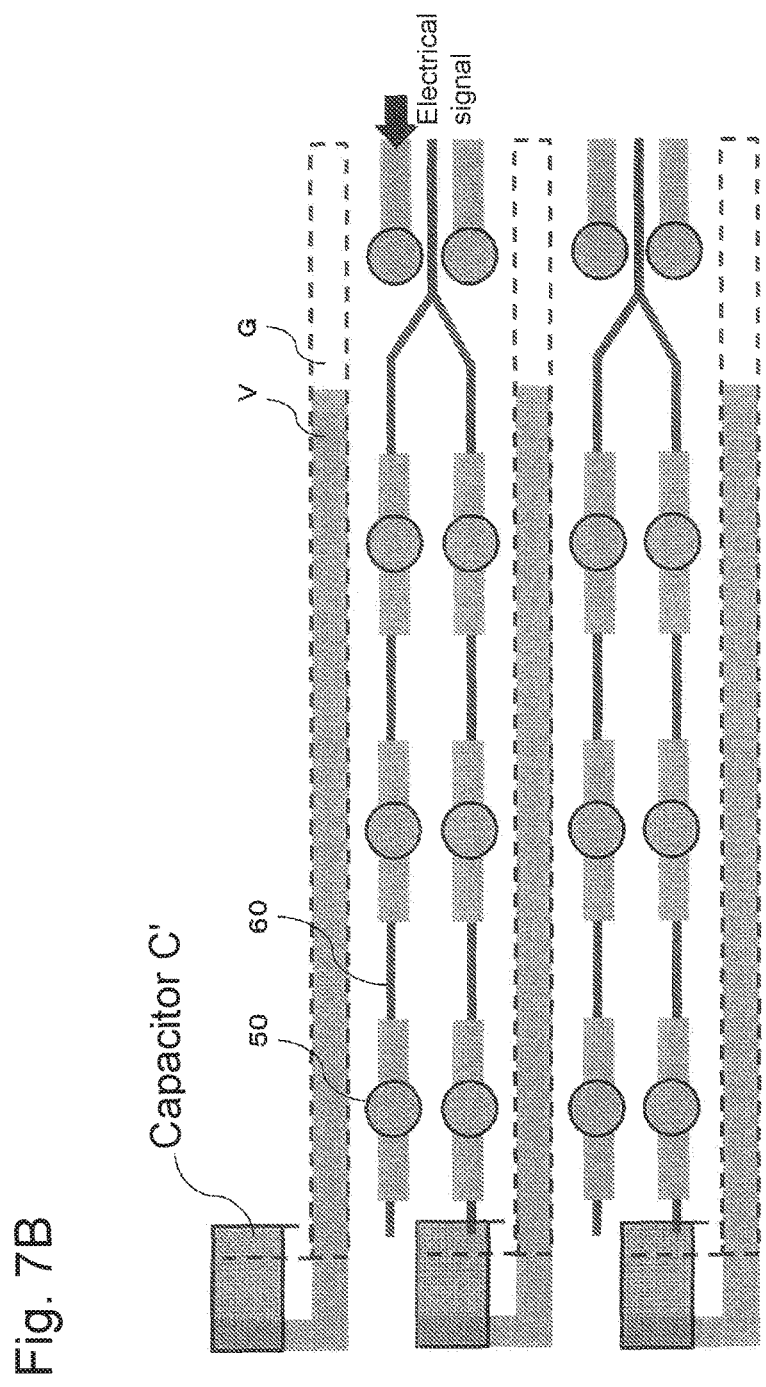

US 10,353,225 B2

ELECTRODE STRUCTURE FOR SILICON PHOTONICS MODULATOR

TECHNICAL FIELD

The present invention relates to an electrode structure in silicon photonics, and, more specifically, relates to an electrode structure in a multichannel, highly-dense, small-sized silicon photonics modulator which is constructed to have a specific electrode structure for integration on a silicon substrate.

BACKGROUND ART

FIG. 1 is a schematic drawing of an electrode structure for a prior-art optical modulator. In this example, an external modulation system using an LN modulator is shown. In prior art, a bias tee circuit 2, which comprises a DC field coil (L1) and a DC block capacitor (C), is coupled between an optical modulator 3 and a driver circuit 1 which drives the optical modulator. In general, a bias voltage is applied from the bias tee circuit 2 to thereby stably operate the optical modulator 3. FIG. 2 is a schematic circuit diagram of an electrode structure relating to a modulator which uses a silicon photonics modulator and a compound semiconductor in prior-art which are integrated on a silicon substrate by use of a silicon photonics technique. In FIG. 2, with respect to a signal electrode (S) side of a silicon photonics modulator 30 which is represented as capacitor C1 in a simplified manner, a bias circuit 20 is coupled to a driver IC circuit 10. The bias circuit 20 comprises, as shown, a resistance wire R, a DC power source (V1), and a capacitor (C); and, by varying, in an adjustable manner, a DC level with respect to a high frequency signal from the driver IC circuit, the silicon photonics modulator is operated at high speed.

However, in the construction that a bias tee such as that shown in FIG. 1 is adopted at the signal electrode side, it is forced to design the DC field coil (L1) and the DC block capacitor (C) to have large sizes, for maintaining a signal characteristic of the high frequency signal and stably operating the modulator. Thus, for the reason due to the physical size of the bias tee, it is difficult to arrange, in a monolithic manner, a bias tee circuit on a silicon substrate. On the other hand, in a construction similar to that shown in FIG. 2, it is necessary to set the impedance of the bias circuit to be sufficiently high, with respect to the signal electrode (S). Thus, in the case that plural modulators are integrated in a highly dense manner, or in the case, which will be explained in relation to the following embodiment, that an separated-electrode-type (divided-type) modulator is used as the modulator, there is a problem, which arises when miniaturization and densification are expected to be achieved, due to necessity that a capacitor C and a resistance wire R are arranged for each signal wire.

In prior art, for solving the above problem, it is further considered to construct an electrode to which a bias voltage can be applied at the ground electrode (GND) side (rather than the signal electrode side), such as that shown in FIG. 3, for example. Specifically, a DC power source (V2) is provided at the ground electrode side, allowing the bias voltage to be applicable in response to a voltage difference from the voltage at the signal electrode side, so that the ground electrode side is constructed as a bias element. As a result of such a design, it becomes possible to apply a bias voltage without necessity to provide a bias circuit such as that shown in FIG. 2. Thus, the problem due to the physical size of the bias circuit, which arises when miniaturization and densification are expected to be achieved, is overcome to a certain extent.

Further, FIG. 4 (a) and FIG. 4 (b) show top views of silicon substrates relating to electrode structures of silicon photonics modulators, and they correspond to the circuit of FIG. 3. FIG. 4 (a) is a single-channel-type electrode structure, and FIG. 4 (b) shows an overview of a multichannel-type electrode structure (three channels in the figure).

As shown in FIG. 4 (a), an example basic structure of a single-channel-type electrode is realized by providing a modulator waveguide with patterns of two parallel bias electrical wires V for applying bias voltages, and a pattern of a signal electrode part S comprising three segments for inputting electric signals and a pattern of a corresponding complementary signal electrode part S' between the two electrical wire patterns.

In reality, a driver circuit (not shown in the figures) is positioned over the above elements. Further, a silicon photonics modulator itself is positioned below each of patterns of the signal electrode part S comprising three segments and the complementary signal electrode part S'. That is, in this explanation, a silicon photonics modulator with a divided-type electrode (a divided-type modulator) is assumed. On the other hand, in the case that a modulator with a travelling-wave-type electrode (a travelling-wave-type modulator) is applied, a person skilled in the art will understand that each of patterns of the signal electrode part S and the corresponding complementary signal electrode part S' comprises a single segment, and that a single modulator is arranged below each of the patterns.

An electrode structure for a silicon photonics modulator in FIG. 4 (b) is realized as an embodiment which comprises three sets of the electrode structures shown in FIG. 4 (a), each corresponding to a single channel, which are arranged in parallel with each other to thereby have a multichannel structure (three channels) and high density.

FIG. 5 is a circuit diagram comprising the equivalent circuit of the electrode structure shown in FIG. 3, wherein inductance (L2) is further added thereto by taking increasing of inductance due to densification into consideration. FIG. 6 is a graph of frequency response of a modulator which is measured by use of the circuit shown in FIG. 5 while changing the value of the inductance L2. In this case, the horizontal axis represents frequencies (the unit is GHz) and the vertical axis represents frequency response (the unit is dB); and the cases that the inductance values of L2 shown in FIG. 5 are set to 0.2 nH, 0.1 nH, 0.05 nH, and 0 nH correspond to lines [1]-[4] in the graph, respectively.

As would be understood from the graph in FIG. 6, when the frequency is 10 GHz, for example, it can be seen that the frequency response becomes lower as the inductance becomes larger (from 0 nH), that is, the impedance of the electrical wire pattern increases and, as a result, the frequency response deteriorates.

That is, as explained in relation to FIG. 4 (a), narrowing, as a result of densification, of the width w of the electrical wire of the electrical wire pattern V of the bias means increasing of inductance, and the characteristic of the modulator is adversely affected thereby. On the other hand, even in the case that the width w of the electrical wire of the electrical wire pattern V of the bias is widen by taking the above inductance into consideration, it is observed, according to experiments performed by the inventors of the invention, that there is almost no improvement with respect to the frequency response of the modulator (also refer to FIG. 13 which will be explained later), and, rather, deterioration in the electric signal waveform in a high frequency signal is observed. Thus, the width w of the electrical wire of the electrical wire pattern V of the bias, is of no direct effect on improvement of the frequency response of the silicon photonics modulator.

CITATION LIST

Non Patent Literature

NPL 1: "10 Gb/s Compact InP MZ Modulator, Negative Chirp, with DWDM Laser, LMC10NEG" (http://www.oclaro.com/datasheets/LMC10NEG%20Datasheet%20-%20D00019-PB%20%5B04%5D.pdf)

SUMMARY OF INVENTION

Technical Problem

In an electrode structure for a multichannel and highly-dense silicon photonics modulator, a problem is that how an electrode structure can be constructed to realize that an inductance component of a bias electrode is made to be close to 0 nH and, thus, that the frequency characteristic is made to be close to that shown in [4] of FIG. 6.

Accordingly, an object of the present invention is to provide an electrode structure in a multichannel, highly-dense, small-sized silicon photonics modulator which is constructed to have a specific electrode structure for integration on a silicon substrate, to thereby allow the silicon photonics modulator to be operated at high speed by use of a high frequency.

Solution to Problem

For solving the above problem, the present invention provides an electrode structure for a silicon photonics modulator. The electrode structure comprises, on a plane of a silicon substrate, a first layer for forming plural bias electrical wires, and a second layer formed by aligning plural ground electrode parts with the electrical wires in the first layer respectively.

Further, the electrode structure of the present invention for the silicon photonics modulator is characterized in that it is constructed in such a manner that the plural bias electrical wires are electrically connected with each other in the first layer, and the plural ground electrode parts are electrically connected with each other in the second layer.

Further, in the electrode structure of the present invention for the silicon photonics modulator, the silicon photonics modulator comprises plural divided-type modulators. Further, the electrode structure is characterized in that it is constructed in such a manner that plural signal electrode parts are arranged in parallel with the electrical wires in the first layer, the plural electrical wires are electrically connected with each other through spaces between the signal electrode parts in the first layer, and the plural ground electrode parts are electrically connected with each other through spaces between the signal electrode parts in the second layer.

BRIEF DESCRIPTION OF DRAWINGS

FIG. 4($b$) is a schematic top view of a silicon substrate, in an electrode structure for a prior-art silicon photonics modulator.

FIG. 7A is an example schematic top view of a silicon substrate, in an electrode structure for a silicon photonics modulator, according to an embodiment of the present invention.

FIG. 7B is another example schematic top view of a silicon substrate, in an electrode structure for a silicon photonics modulator, according to an embodiment of the present invention.

DESCRIPTION OF EMBODIMENTS

An electrode structure for a silicon photonics modulator integrated on a plane of a silicon substrate, according to an embodiment of the present invention, will be explained below with reference to the figures. Note that similar symbols are assigned to components which are similar with each other.

Figure 1:
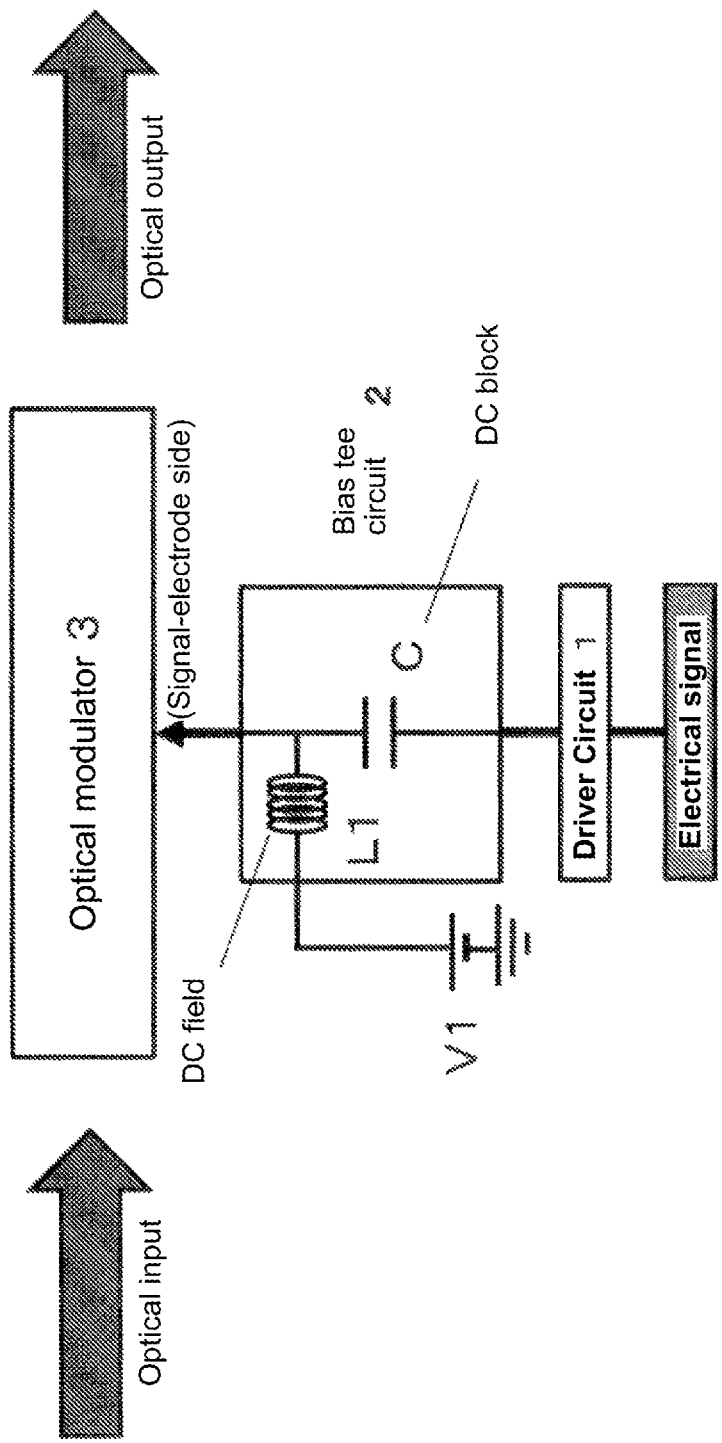
FIG. 1 is a schematic drawing of an electrode structure for a prior-art optical modulator.
Figure 2:
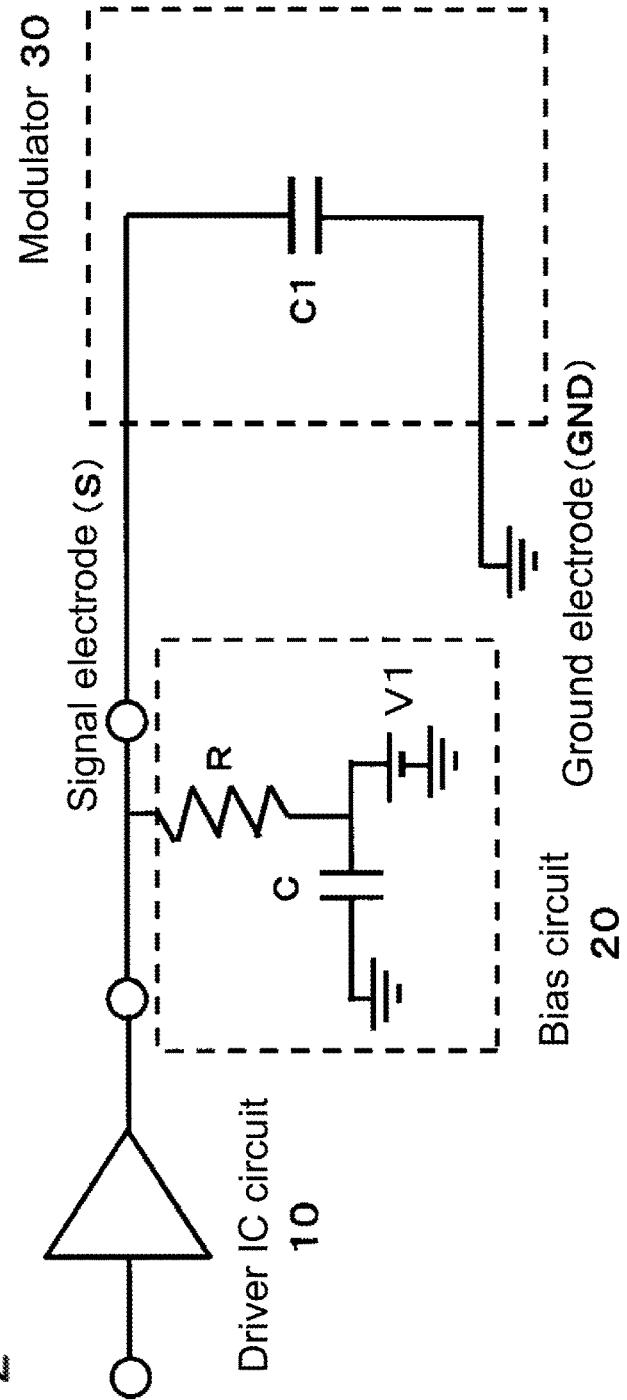
FIG. 2 shows an example of a circuit diagram of an electrode structure for a prior-art silicon photonics modulator.
Figure 3:
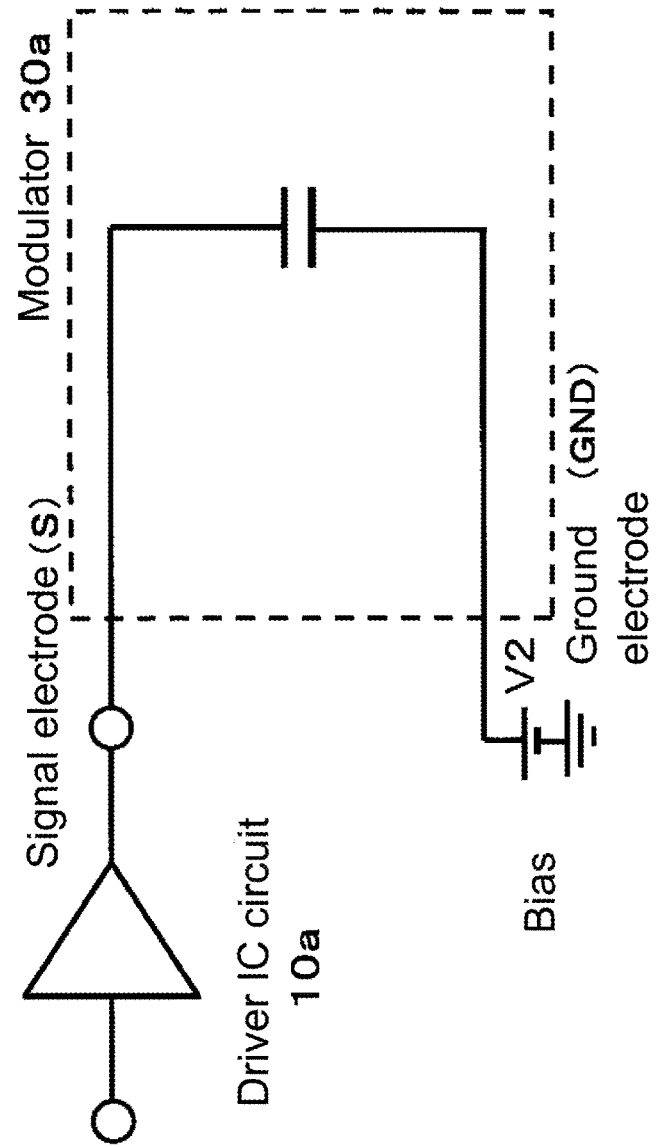
FIG. 3 shows another example of a circuit diagram of an electrode structure for a prior-art silicon photonics modulator.
Figure 4:
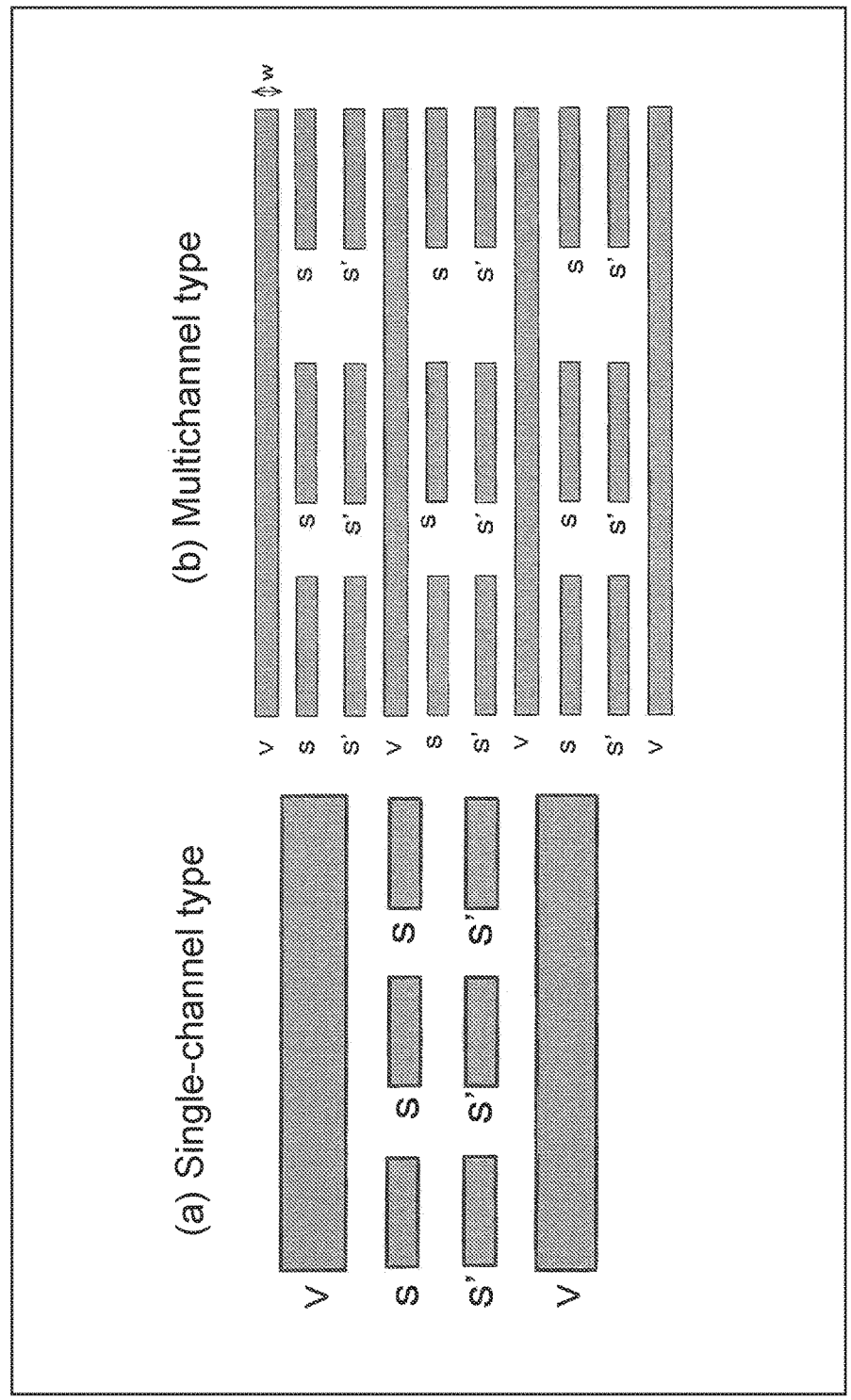
FIG. 4($a$) is a schematic top view of a silicon substrate, in an electrode structure for a prior-art silicon photonics modulator.
Figure 8:
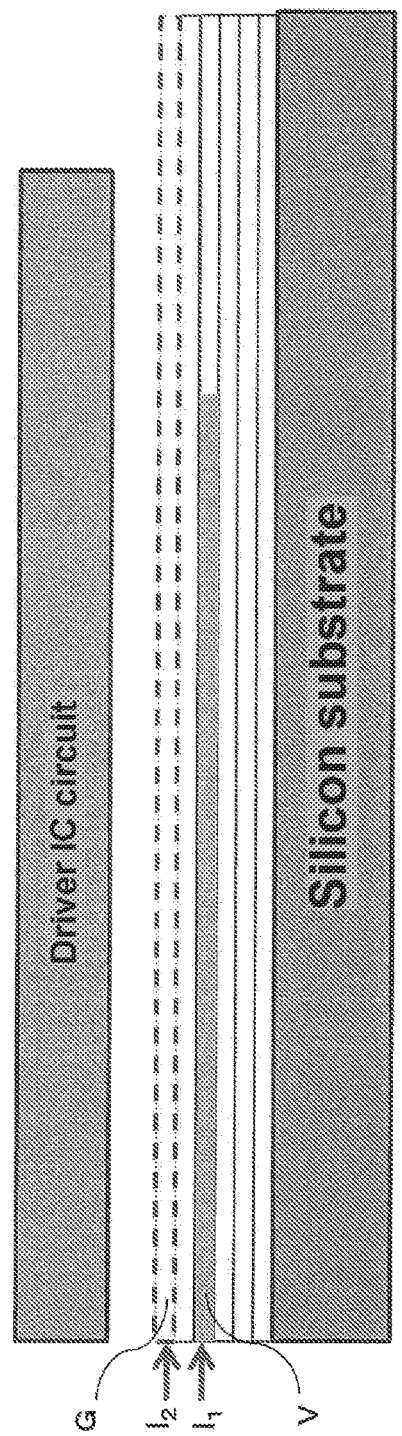
FIG. 8 is an example cross-section view of the electrode structure for the silicon photonics modulator of FIG. 7A.
Figure 9:
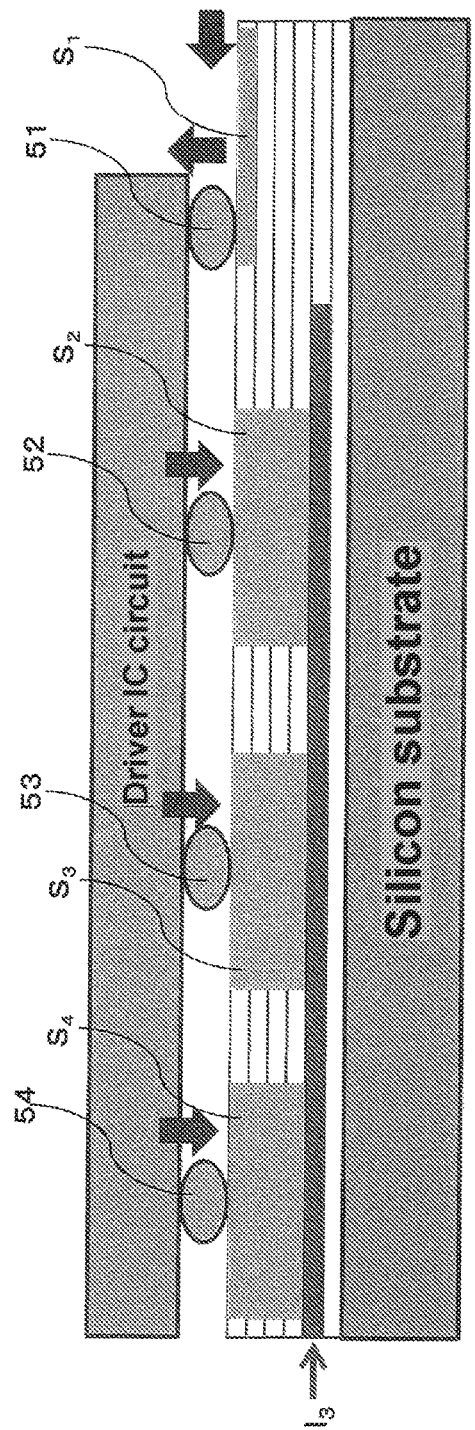
FIG. 9 is another example cross-section view of the electrode structure for the silicon photonics modulator of FIG. 7A.

FIG. 7A is an example schematic top view of a silicon substrate relating to an electrode structure for a silicon photonics modulator, according to an embodiment of the present invention. FIG. 8 shows an example of a cross-section view at the first row, the fourth row, or the seventh row in FIG. 7A, and FIG. 9 shows an example of a cross-section view at the second row, the third row, the fifth row, or the sixth row in FIG. 7A. FIG. 7A also shows electric signal input parts 50 for receiving input of electric signals from a driver IC circuit (not shown in the figure) which covers a part of a circuit as illustrated by the top surface in the top view, and optical waveguides 60 for inputting and outputting optical signals (which are not shown in FIG. 4).

FIG. 7A and FIG. 8 are referred to. When paying attention to the first row in FIG. 7A, it can be seen that the pattern (the color painted part) of the bias electrical wire V formed on the waveguide of the modulator is covered, in an aligned manner, by a pattern (the part defined by a broken line) of the ground electrode part G having a width substantially equal to that of the above pattern. That is, the electrode structure comprises a layer $I_1$ for forming plural bias electrical lines and a layer $I_2$ formed by aligning plural ground electrode parts with the electrical wires in the layer $I_1$, respectively, and they are stacked. As a result, in the electrode structure, the V in the bias electrical wire layer $I_1$ and the G in the ground electrode layer $I_2$ can be used to function as capacitor which has an insulation material between the layers.

Note that, although it has been explained in the above example that the width of the pattern of the bias electrical wire V is substantially equal to that of the pattern of the ground electrode part G, the widths are not limited to the above, thus, the widths may be set to be different. Further, although the ground electrode layer $I_2$ is stacked on the bias electrical wire layer $I_1$ in the above example, the order to stack the layers are not limited to the above. In an opposite manner, the bias electrical wire layer $I_1$ may be stacked on the ground electrode layer $I_2$.

Next, FIG. 9, which corresponds to the second row in FIG. 7A, is referred to. As shown in a series of arrows in FIG. 9, an electric signal is supplied from a signal electrode part $S_1$ formed at an end of the second row to the driver IC circuit via an electric signal input part 51; and, next, the electric signal is received from the driver IC circuit by electric signal input parts 52-54, respectively, and transmitted to signal electrode parts $S_2$-$S_4$, respectively. A layer $I_3$ positioned below the signal electrode parts $S_2$-$S_4$ is provided with an optical waveguide, and a silicon photonics modulator is formed in the layer $I_3$. Thus, the electric signal is supplied and the silicon photonics modulator is driven.

Figure 10A:
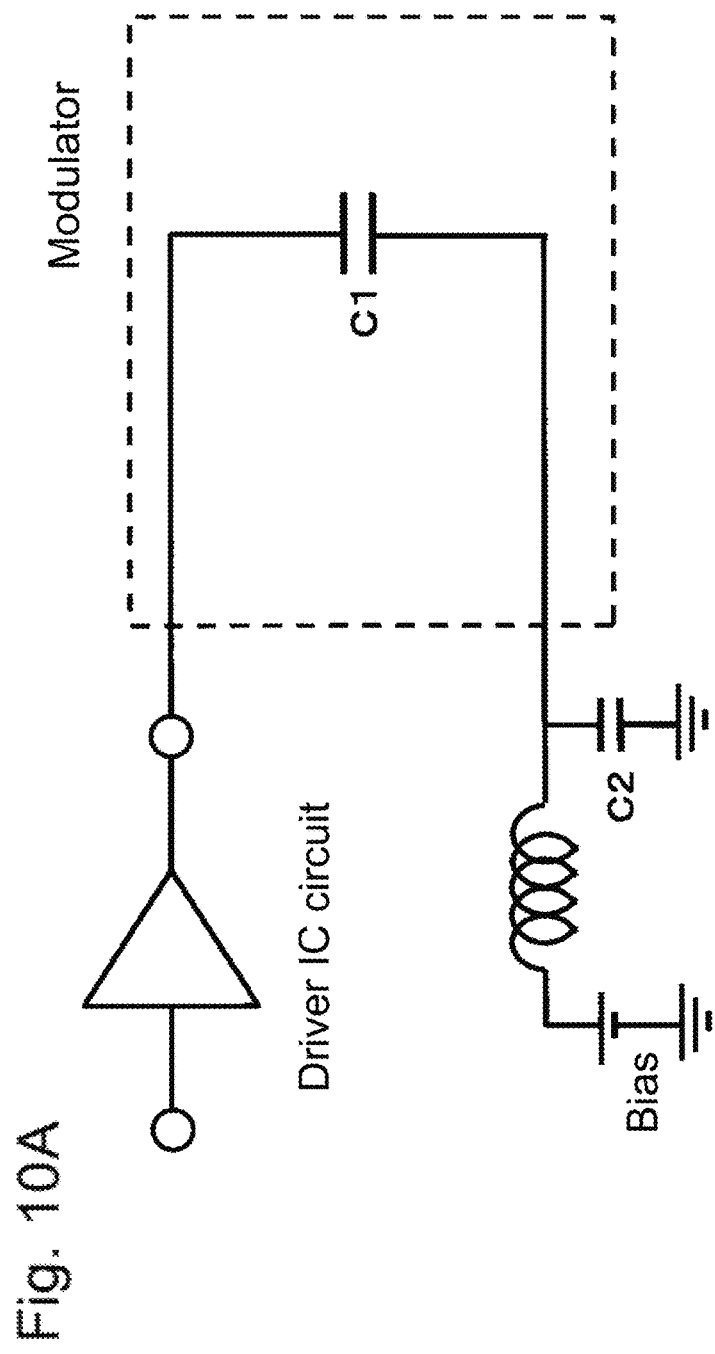
FIG. 10A is a circuit diagram of an equivalent circuit corresponding to the electrode structure for the silicon photonics modulator of FIG. 7A.

FIG. 10A is a circuit diagram of an equivalent circuit corresponding to the electrode structure for the silicon photonics modulator constructed according to the embodiment of the present invention shown in FIG. 7A. As explained above, the electrode structure becomes equivalent to that to which capacitor (C2) is logically added. As a result, it is understood that the impedance of the modulator can be reduced.

Figure 10B:
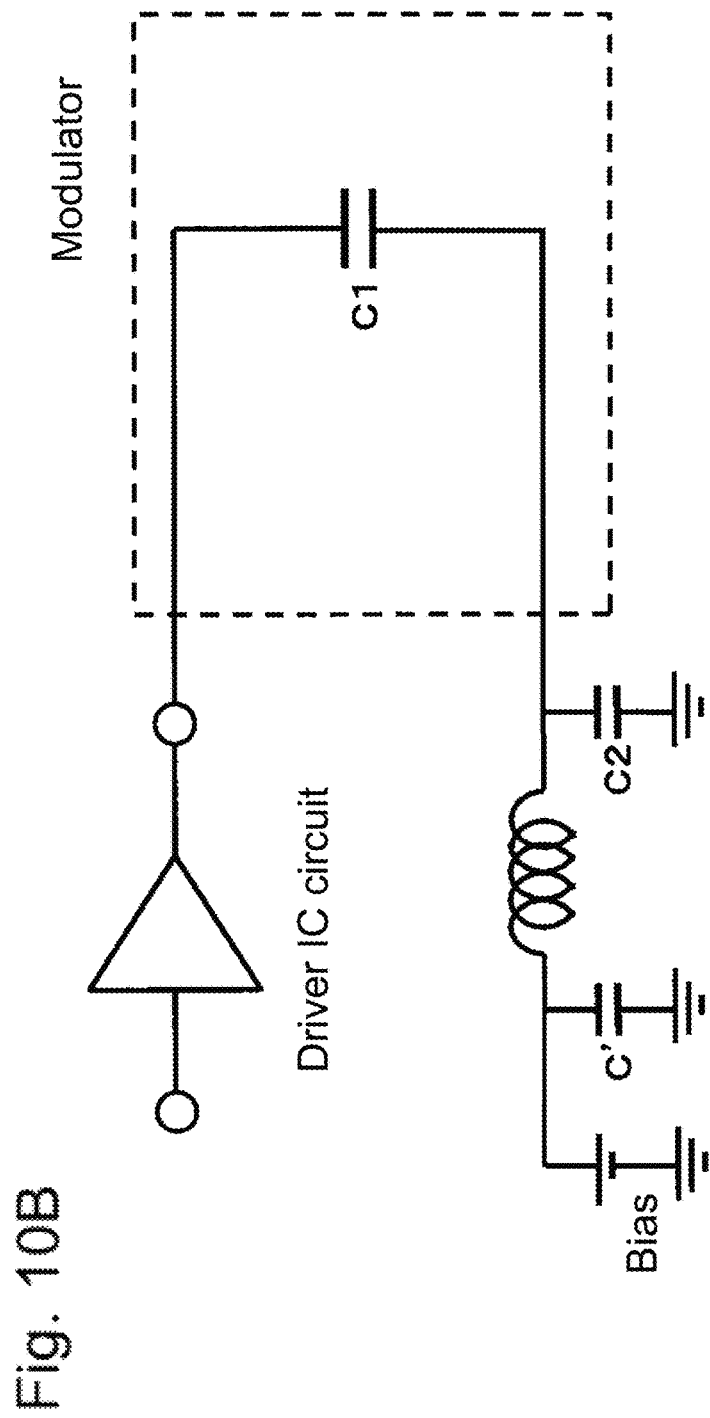
FIG. 10B is a circuit diagram of an equivalent circuit corresponding to the electrode structure for the silicon photonics modulator of FIG. 7B.

Next, FIG. 7B, wherein the electrode structure of FIG. 7A has been modified, is referred to. As shown in FIG. 7B, in an example of an improved electrode structure, capacitance (capacitor chips) (C') is arranged between the bias electrical lines V and the ground electrode parts G which are aligned with the bias electrical lines V, respectively. Thus, an equivalent circuit corresponding to the improved electrode structure constructed as illustrated in FIG. 7A becomes like that of FIG. 10B. In this manner, by providing a capacitor chip (C'), stable operation between the electrode structure and an external element connected from the electrode structure can be expected especially, so that further advantages can be obtained.

Figure 11:
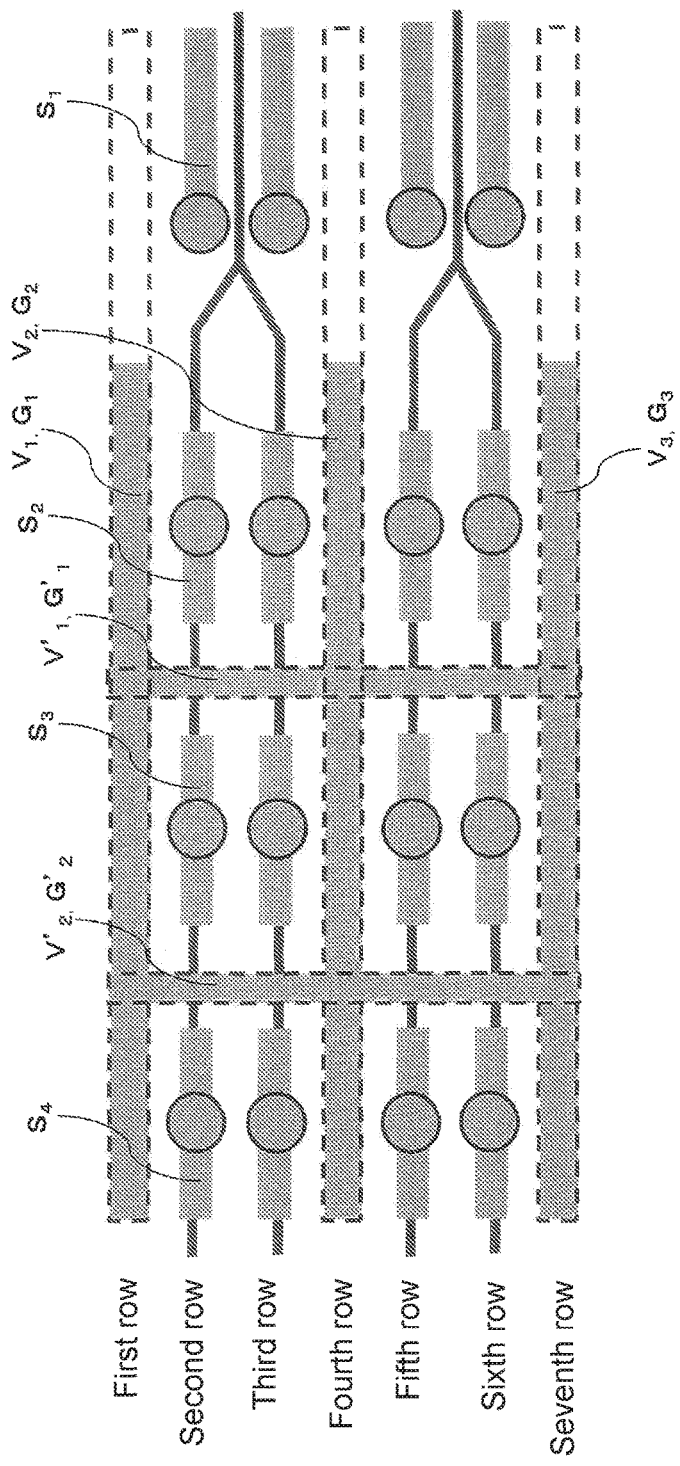
FIG. 11 is a schematic top view of a silicon substrate, in an electrode structure for a silicon photonics modulator, according to another embodiment of the present invention.

As shown in FIG. 11, in another embodiment of the present invention, it is constructed in such a manner that patterns of parallel bias electrical wires $V_1$, $V_2$, and $V_3$ shown in the first row, the fourth row, and the seventh row are electrically connected with each other in a direction perpendicular thereto by wires $V'_1$ and $V'_2$ which are also bias electrical wires, and that ground electrode parts $G_1$, $G_2$, and $G_3$ on the layer of the above bias electrical wires are also electrically connected with each other in a direction perpendicular thereto by ground electrode parts $G'_1$ and $G'_2$. In the example of FIG. 7A, by having the interconnection in the perpendicular direction as explained above, the respective amounts of capacitance that are formed at the first row, the fourth row, and the seventh row, respectively, by parallel flat plates comprising the layer of bias electrical wires V and the layer of ground electrode parts G can function together as a unified amount of capacitance through all channels. As a result, it becomes possible to further stabilize the electric characteristic of the silicon photonics modulator.

Further, in the case that the construction shown in FIG. 7B, i.e., the construction in which capacitor (C') is added between a bias electrical wire V and a ground electrode part G, is applied to the electrode structure shown in FIG. 11, it is possible to electrically connect the bias electrical wire V layers with each other and electrically connect the ground electrode part G layers with each other through all channels. That is, the capacitor (C') required for connection may be only one, in total; and it becomes possible to perform more stable operation.

Figure 12:
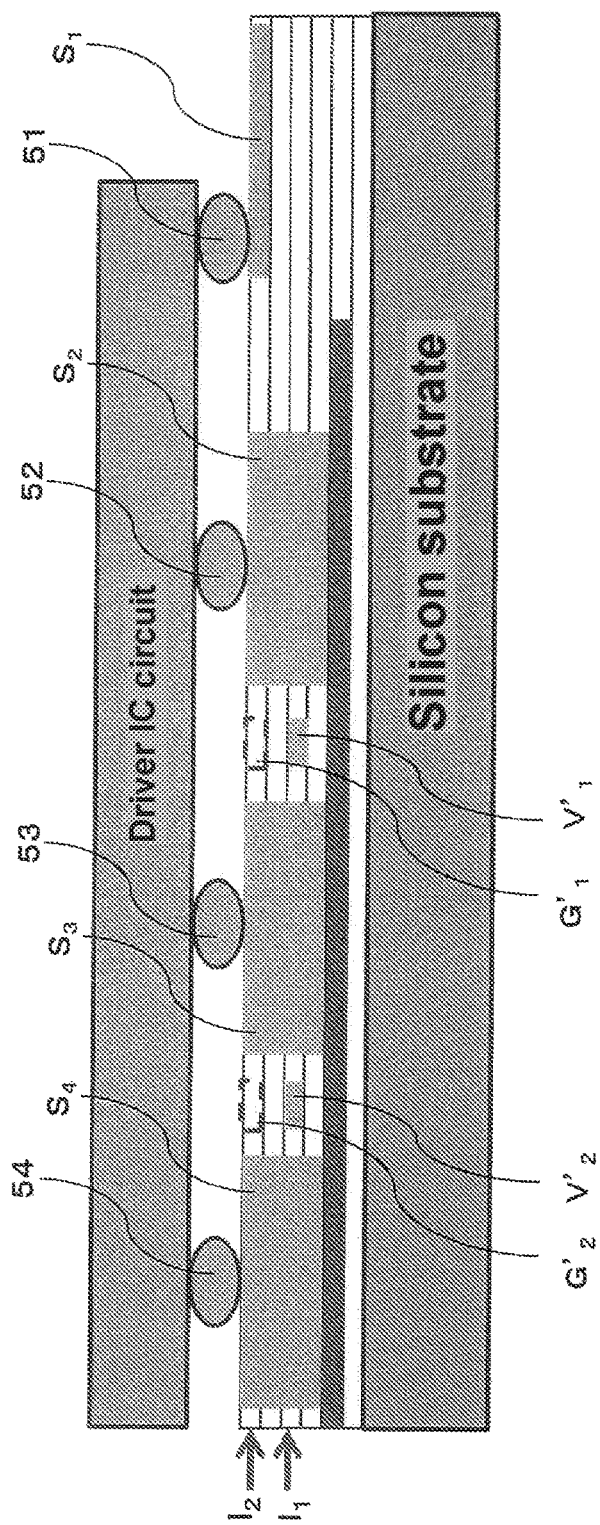
FIG. 12 is an example cross-section view of the electrode structure for the silicon photonics modulator of FIG. 11.

As explained above, a silicon photonics modulator having an electrode structure according to an embodiment of the present invention is constructed as a divided-type modulator in an example. Then, the electrode structure for such a silicon photonics modulator has, for example, four signal electrode parts $S_1$-$S_4$, and they are arranged and patterned in such a manner that it is positioned to be in parallel with the pattern of the bias electrical wire V and adjacent to the first row. FIG. 12 is a cross-section view at the second row, the third row, the fifth row, and the sixth row in FIG. 11, and the electrode structure shown in FIG. 11 can be further understood.

That is, the bias electrical wires $V'_1$ and $V'_2$, which connect the patterns of the bias electrical wires V with each other, are connected through spaces between signal electrode parts (i.e., the spaces between $S_2$ and $S_3$ and between $S_3$ and $S_4$) in the layer $I_1$. Similarly, it can be understood that the ground electrode parts $G'_1$ and $G'_2$, which connect the patterns of the ground electrode parts G on the bias electrical wires V with each other, are connected through spaces between signal electrode parts (i.e., the spaces between $S_2$ and $S_3$ and between $S_3$ and $S_4$) in the layer $I_2$.

On the other hand, in the case that a travelling-wave-type electrode is used as the silicon photonics modulator, spaces such as those between $S_2$ and $S_3$ and between $S_3$ and $S_4$, which are explained above, do not exist; thus, a new layer would be additionally formed, alternately, it is constructed that from a periphery of a long modulator, patterns of bias electrical wires V would be connected with each other and/or patterns of the ground electrode parts G on the bias electrical wires V would be connected with each other.

Figure 13:
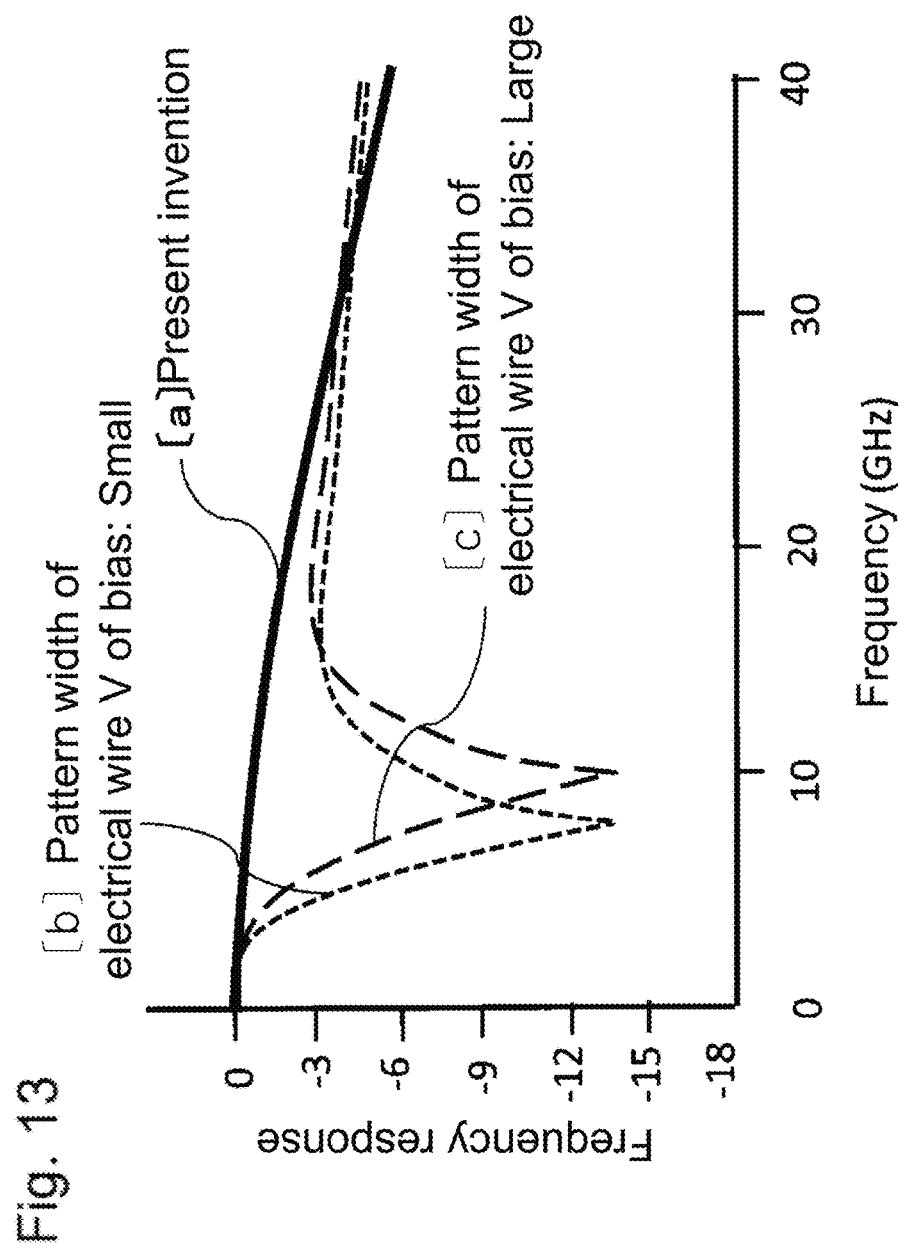
FIG. 13 is a graph of frequency response of a silicon photonics modulator which is measured by use of an electrode structure for the silicon photonics modulator, according to an embodiment of the present invention.

Finally, effect of an electrode structure for a silicon photonics modulator according to an embodiment of the present invention will be explained with reference to FIG. 13. FIG. 13 is a graph of frequency response of a silicon photonics modulator which is measured by use of the electrode structure shown in FIG. 7A or FIG. 11. In the graph, the solid line [a] represents the case of the electrode structure of the present embodiment; on the other hand, the dotted line [b] corresponds to the case wherein the pattern width w of the electrical wire V of the bias shown in FIG. 6 is made to be narrow, and the dashed line [c] corresponds the case which is opposite to the above case, i.e., the case wherein the pattern width w is made to be wide.

Figure 5:
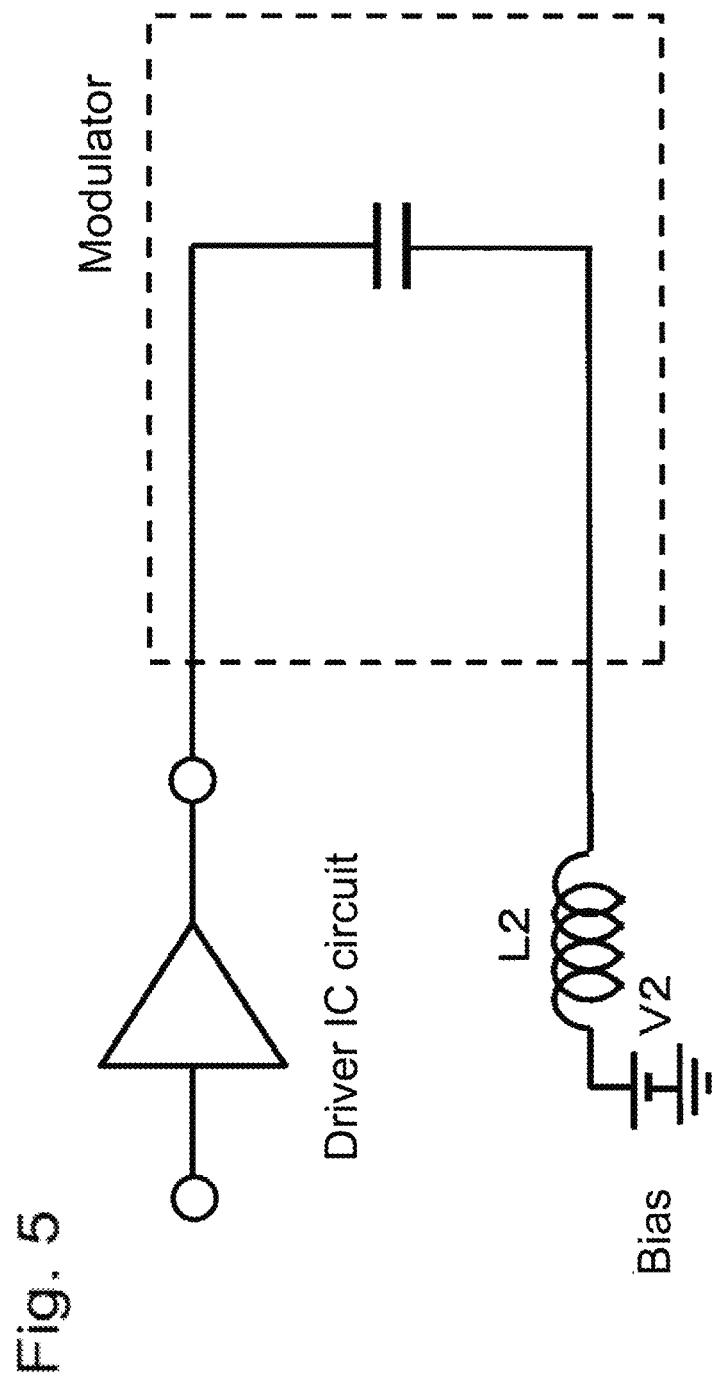
FIG. 5 shows an example of a circuit diagram which comprises the circuit diagram of FIG. 3 to which inductance is added.
Figure 6:
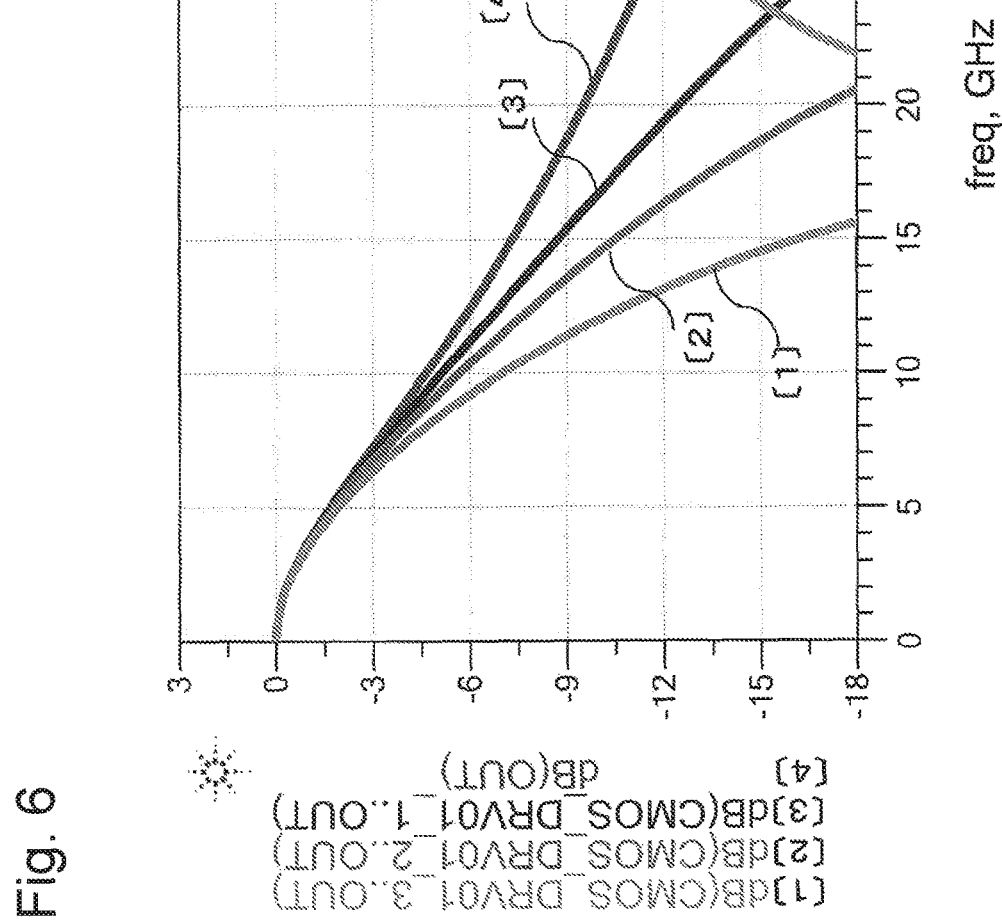
FIG. 6 is a graph of frequency response of a prior-art silicon photonics modulator which is measured by use of the schematic circuit in the schematic circuit diagram of FIG. 5.

As previously explained in relation to FIG. 6, in the cases of the dotted line [b] and the dashed line [c], the electrical characteristic of the silicon photonics modulator is adversely affected by the problem of inductance (L2) of the electrode structure, regardless of the pattern with W of the electrical wire V of the bias. On the other hand, in the case of the solid line [a], i.e., when the electrode structure according to the present embodiment is applied, such quality degradation is not observed; and even in the case of a high frequency (for example, 25 GHz), it is considered that frequency response similar to that in the case of FIG. 6 (specifically, the case that the value of inductance of L2 shown in FIG. 5 is set to 0 nH) will be presented. Thus, it can be fully understood that, by the construction wherein the capacitor C2 is further added to the ground electrode side as shown in the circuit diagram of the equivalent circuit in FIG. 10A, the electrical characteristic of the silicon photonics modulator is greatly improved and the frequency response of the modulator is improved.

In the above description, the embodiments of the present invention has explained with reference to the drawings; and, in this regard, it should be reminded that a person skilled in the art can use other similar embodiments, and can appropriately perform modification of an embodiment and/or addition to an embodiment without departing from the present invention. Note that the present invention should not be limited to the above embodiments; and the present invention should be construed based on the descriptions in the claims.

The invention claimed is:

1. An electrode structure for a silicon photonics modulator comprising, on a plane of a silicon substrate:

a first layer for forming plural bias electrical wires; and a second layer formed by aligning plural ground electrode parts with the electrical wires in the first layer respectively, wherein the plural bias electrical wires are electrically connected with each other in the first layer, the plural ground electrode parts are electrically connected with each other in the second layer, the silicon photonics modulator is constructed with plural divided-type modulators, plural signal electrode parts are arranged in parallel with the electrical wires in the first layer, the plural electrical wires are electrically connected with each other through spaces between the signal electrode parts in the first layer, and the plural ground electrode parts are electrically connected with each other through spaces between the signal electrode parts in the second layer.

2. The electrode structure according to claim 1, wherein capacitance for connection between each of the electrical wires in the first layer and each of the aligned ground electrode parts in the second layer is further provided individually.

3. The electrode structure according to claim 1, wherein capacitance for connection between the interconnected electrical wires in the first layer and the interconnected ground electrode parts in the second layer is further provided.

* * * * *